United States Patent [19]

Le Roy

[11] Patent Number: 5,086,348
[45] Date of Patent: Feb. 4, 1992

[54] SYSTEM FOR CONNECTING OPTICAL LINES TO A WIDEBAND TELECOMMUNICATIONS EXCHANGE

[75] Inventor: Guy Le Roy, Lannion, France

[73] Assignee: Alcatel Cit, Paris, France

[21] Appl. No.: 444,356

[22] Filed: Dec. 1, 1989

[30] Foreign Application Priority Data

Dec. 6, 1988 [FR] France .................. 88 15968

[51] Int. Cl.$^5$ .................................................. H04J 14/00
[52] U.S. Cl. ..................................... 358/117; 359/161
[58] Field of Search ............... 455/600, 601, 606, 607,
455/612, 617; 370/1, 3, 16

[56]  References Cited
U.S. PATENT DOCUMENTS

| 4,365,248 | 12/1982 | Bargeton | 370/16 |
| 4,451,708 | 5/1984 | Kemler et al. | 179/98 |

FOREIGN PATENT DOCUMENTS

| 0168342 | 10/1983 | Japan | 455/601 |
| 0003237 | 1/1985 | Japan | 455/600 |
| 0012217 | 1/1987 | Japan | 455/600 |
| 0059126 | 3/1988 | Japan | 455/601 |

OTHER PUBLICATIONS

Jtr–Japan Telecommunications Review, vol. 29, No. 2, Apr. 1987, pp. 23–29, Tokyo, Japan; M. Hirata; "High Reliability Subscriber Loops with Free Access Point Concept".

Primary Examiner—Reinhard J. Eisenzopf
Assistant Examiner—L. Pascal
Attorney, Agent, or Firm—Sughrue, Mion, Zinn, Macpeak & Seas

[57] ABSTRACT

The connection system includes at least one connection assembly having at least one connection module with a connection capacity of N optical lines. A connection module comprises first, second, and third optical switch assemblies (C11 to C1n, C21 to C2n, and C31, C32). The first assembly is connected to the N optical lines, the second assembly is connected firstly to the first assembly and secondly to the junctors and the spare junctors associated with the N optical lines, and the third assembly is connected firstly to the first assembly and secondly to at least one test circuit via a line test optical fiber and via a junctor test optical fiber. When using narrowband optical switches, there are two switching assemblies, one for transmission and the other for reception of the signals conveyed by the optical lines, when using wideband optical switches, then a single switching assembly is used both for transmission and for reception, i.e. for both call directions.

10 Claims, 9 Drawing Sheets

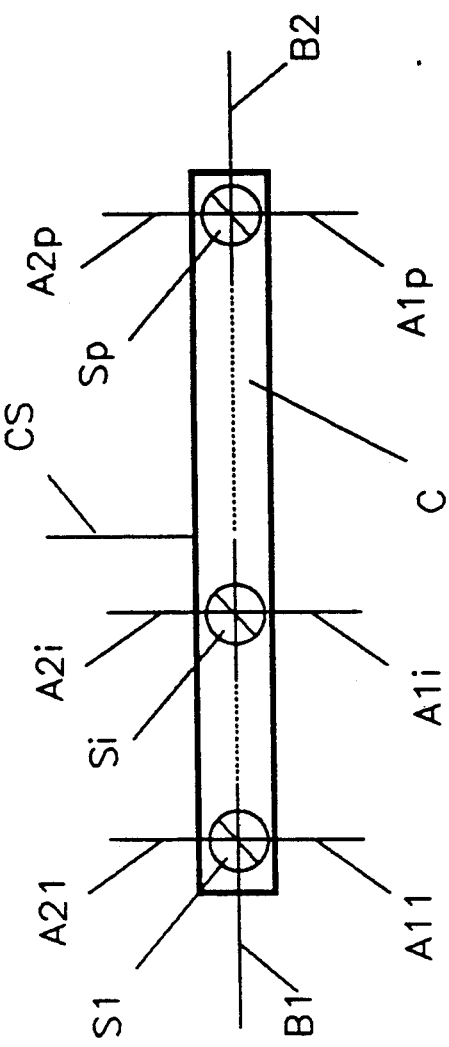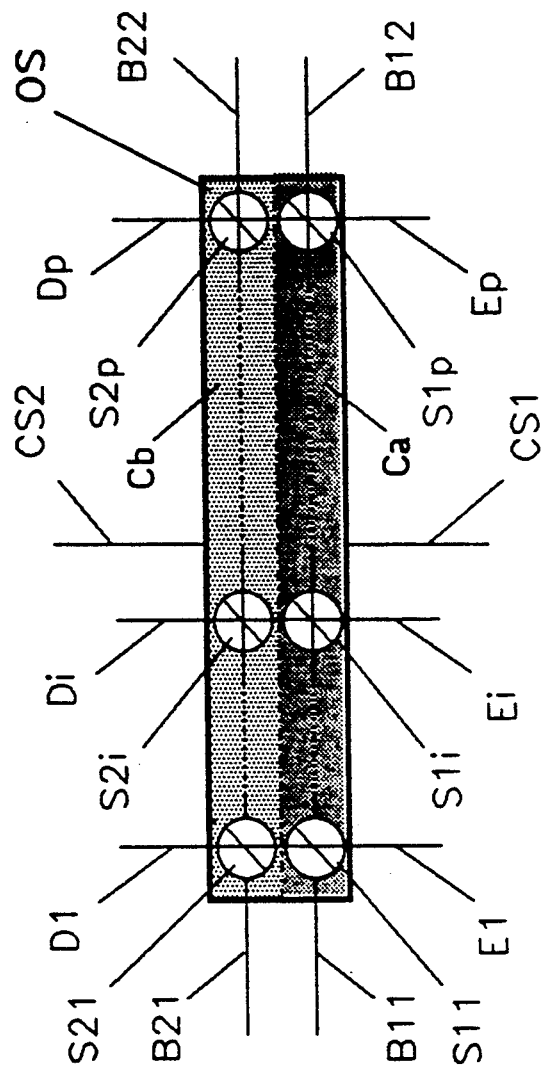
FIG. 2A
FIG. 2B

SYSTEM FOR CONNECTING OPTICAL LINES TO A WIDEBAND TELECOMMUNICATIONS EXCHANGE

BACKGROUND OF THE INVENTION

The invention relates to a system for connecting optical distribution lines and optical junction lines to an exchange, said lines respectively connecting subscribers to exchanges and interconnecting exchanger in a wideband multiservice telecommunications network such as the BISDN network or the switched remote distribution network, the system of the invention enabling lines to be tested automatically and enabling faulty junctors to be replaced by spare junctors An optical line for distribution or for junction purposes and conveying signals relating to both directions of a call by means of two different optical wavelengths, is constituted:

either by two optical fibers each conveying signals in one of the directions of the call, each fiber being connected at one end directly to a transmission circuit including an optoelectronic component such as a laser, and being directly connected at its other end to a reception circuit containing an optoelectronic component such as a PIN diode, with said transmission and reception circuits situated at the same end of the line constituting the optoelectronic interface which may constitute:

a line junctor in the exchange;
terminal equipment on subscriber premises; or
a junction junctor in a remote exchange;

or else by a single optical fiber conveying signals in both directions of the call and connected at each of its ends to optical duplexing means having two other outlets is connected to a transmission circuit and the other one of which to the reception circuit of a junctor in an exchange or of terminal equipment on subscriber premises, or of a junction junctor.

The assembly constituted by a line and the interface circuits connected to the ends thereof constitutes a link.

If any of the components in a link is faulty, then that link is unavailable and service is interrupted for a period of time depending on the time required to detect the fault and the time required for repairing it.

Like other telecommunications networks, wideband multiservice networks make use of a very large number of links such as those described above. Although the unit failure rate of links is low, the large numbers thereof naturally give rise to a relatively large number of breakdowns that must not only be detected and analysed, but which must also be repaired in order to ensure good quality service.

The arrangements for detecting breakdowns in links and for remedying failures while minimizing immediate maintenance activity constitute "link securization".

The securization of subscriber telephone lines constituted by pairs of copper wires connected to respective junctors is a known problem: numerous circuits have been described that make use of electromechanical relays inserted on the lines and operating under the supervision of control circuits both to connect lines and junctors to test apparatus and also to connect lines to spare junctors.

In French patent number FR-A-2 503 500 (=U.S. Pat. No. 4,451,708), for "A subscriber terminal security circuit", the circuit described makes use in the exchange of at least one spare terminal or unit comprising a plurality of spare terminals connected to the trunk(s) interconnecting subscribers lines and test equipment via an isolating circuit, and capable of replacing any of the terminals corresponding to the subscriber lines connected to the test trunks by switching over the test trunk connection relay of any given faulty terminal or by switching over the test trunk connection relays of the terminals in the unit including a faulty terminal.

In French patent number FR-A-2 555 388 (=U.S. Pat. No. 4,594,704), "A subscriber terminal security circuit in a digital concentrator", the circuit described in the concentrator makes use not only of a line test bus and a terminal test bus each connectable to a multiplicity of test trunks serving each of a group of subscriber lines, but also of a spare bus connectable to the subscriber line test trunks and enabling any of the subscriber lines in a group of lines having a faulty terminal to be connected to any terminal in a group of terminals serving some other group of lines, the terminal in question being connected to no subscriber line and serving as a spare terminal In the above-mentioned patents, the security circuits also include means for controlling connection means to the spare and to the test apparatuses.

The organization and the means described are naturally specific to copper line technology and cannot be used directly or merely extrapolated for use with optical lines since they are subject to special constraints, particularly with respect to connection and insertion of circuits, which constraints do not exist when using copper lines.

It should also be observed that the above-described circuits are optimized economically for telephone service in which call durations are relatively short and in which there are long periods of low traffic, and they suffer from a structural feature which becomes a major drawback when applied to a multiservice system in which lines have high activity rates and in which the calls on some services last for relatively long periods of time, and this structural feature is the impossibility of performing tests in a group of lines or a line terminal unit that includes a line connected to a spare junctor without simultaneously disconnecting that line from the security means, i.e. without interrupting the service on that line, and this is due to the fact that the connections to the test equipment and the connections to the security means share common items.

Systems are also known for securization of optical links, in particular for long distance transmission, and consist in providing additional optoelectronic components in the interface associated with each line, said components being connected to the lines by switching means using mechanical displacement.

In particular, the present Applicant has described in French patent number FR-A-2 528 586 (=GB-A-2 122 371) "Optical switching devices" a device enabling one laser diode out of four to be selected at the end of an optical fiber, the device comprising a first switching stage comprising two optical changeover switches and a coupling stage constituted by a passive Y-coupler, and in patent application FR-A-2 602 061 (=U.S. Pat. No. 4,759,597), "Mechanical switch for optical fibers", the present Applicant describes a switch suitable for use in the switching stage of the preceding patent.

Such systems cannot be used for providing security for a large number of links for technical and economic reasons: bulkiness of the equipment, and protection limited to failures in the optoelectronic interface components, thus requiring other arrangements to be made to mitigate failures in the electronic circuits in any link.

The object of the invention is to provide a system for connecting optical lines to an exchange, the system making the following possible:

line and junctor testing by automatic means, and in particular by optical and optoelectronic means included in the lines and the junctors;

testing of lines connected to spare junctors, and the testing of spare junctors regardless of whether they are connected to lines, and without interrupting service on other lines;

the connection of spare junctors only to lines which are observed as being faulty; and self-testing of the test devices;

the system also not degrading the transmission budgets of optical links regardless of their configuration: nominal; on test; or connected to spare junctors; thereby making it possible to implement spare junctors which are identical to the junctors normally associated with the lines and to implement test circuits using optoelectronic components which are identical to those implemented in the junctors;

the size and the modularity of the system being such as to enable the system to be used in exchanges of various different sizes and whose sizes may change over time; and system cost should be optimized.

SUMMARY OF THE INVENTION

The present invention provides a system for connecting an exchange to optical subscriber lines and to optical junction lines in a wideband multiservice telecommunications network such as BISDN networks and switched remote distribution networks, each optical line connected to a subscriber being connected firstly to a transmission circuit and a reception circuit in a subscriber terminal located on subscriber premises and secondly to a transmission circuit and a reception circuit in a junctor of the exchange, each optical line connected to a junction being connected to a transmission circuit and a reception circuit in a junctor of a distant exchange and to a transmission circuit and a reception circuit of a junctor in the exchange, said exchange also including spare junctors, wherein:

the optical lines are connected to the junctors of the exchange and to its spare junctors via at least one connection assembly including at least one connection module having a connection capacity of N optical lines;

a connection module comprises first, second, and third optical switch assemblies; and in the connection module, the first optical switch assembly is connected to the optical lines, the second optical switch assembly is connected both to the first optical switch assembly and to the junctors and to the spare junctors associated with the N optical lines, and the third optical switch assembly is connected both to the first optical switch assembly and to at least one test circuit via a test line optical fiber and via a junctor test optical fiber.

The optical lines may be connected to the junctors of the exchange and to the spare junctors via a single connection assembly conveying optical signals in both call directions, in which case each optical line may be constituted by a single optical fiber conveying optical signals in both call directions, each junctor and each spare junctor may be connected to the second optical switch assembly via a duplexer and a single optical fiber, and the connection assembly may be connected via the line test optical fiber and a duplexer to a transmission test circuit and to a reception test circuit, and via the junctor test optical fiber and another duplexer to said transmission test circuit and to said reception test circuit.

The connection system may include first and second connection assemblies each specific to one call direction, in which case each transmission circuit of the junctors and of the spare junctors may be connected via a transmission fiber to the first connection assembly, each reception circuit of the junctors and of the spare junctors may be connected via a reception fiber to the second connection assembly, each optical line may be constituted by a single optical fiber connected to both connection assemblies by means of a duplexer, each connection assembly may be connected via an optical fiber, to said duplexer, and the first connection assembly may be connected to a transmission test circuit, with the second connection assembly being connected to a reception test circuit.

The connection system may include first and second connection assemblies each specific to one call direction, in which case each transmission circuit of the junctors and of the spare junctors may be connected via a transmission optical fiber to the first connection assembly, each reception circuit of the junctors and of the spare junctors may be connected via a reception optical fiber to the second connection assembly, each optical line may be constituted by first and second optical fibers, each reception circuit of the subscriber terminals and of the remote junctors may be connected via the first optical fiber of an optical line to the first connection assembly, each transmission circuit of the subscriber terminals and of the remote junctors may be connected via the second optical fiber of an optical line to the second connection assembly, and the first connection assembly may be connected to a transmission test circuit, while the second connection assembly is connected to a reception test circuit.

The connection system may include a plurality of connection modules and a fourth optical switch assembly, the third optical switch assembly of each of the connection modules being connected to the fourth optical switch assembly, and the said fourth optical switch assembly being connected to at least one test circuit via said line test optical fiber and via said junctor test optical fiber.

Each optical switch assembly may be constituted by optical switches each having two groups of accesses, the first group of accesses each comprising p pairs of accesses comprising a first access and a second access which are normally connected to each other via means internal to the optical switch, and the second group of accesses comprising a first access and a second access which are respectively connected to the first access and the second access of any one of the p pairs of accesses in the first group by means internal to the optical switch after breaking the internal connection between the access in the pair.

The second optical switch assembly may be constituted by optical switches each having two groups of p accesses such that the accesses of the same rank in each of the two groups are associated and connected to each other via means internal to the optical switches, and at least one internal connection via which any one of the accesses of the first group may be connected to any one of the accesses of the second group after breaking the respective internal connections between each of said accesses and the accesses associated therewith.

The optical switches of the first and second optical switch assemblies which are interconnected to each other may be associated to form an optical matrix.

The optical switches of the connection assemblies may be connected via control lines to a control circuit which is itself connected to the control means of the exchange.

BRIEF DESCRIPTION OF THE DRAWINGS

Embodiments of the invention are described by way of example with reference to the accompanying drawings, in which:

FIGS. 2A and 2B are respectively a theoretical diagram and practical implementation of an optical switch such as those used in the system;

DETAILED DESCRIPTION

Figure 1A:
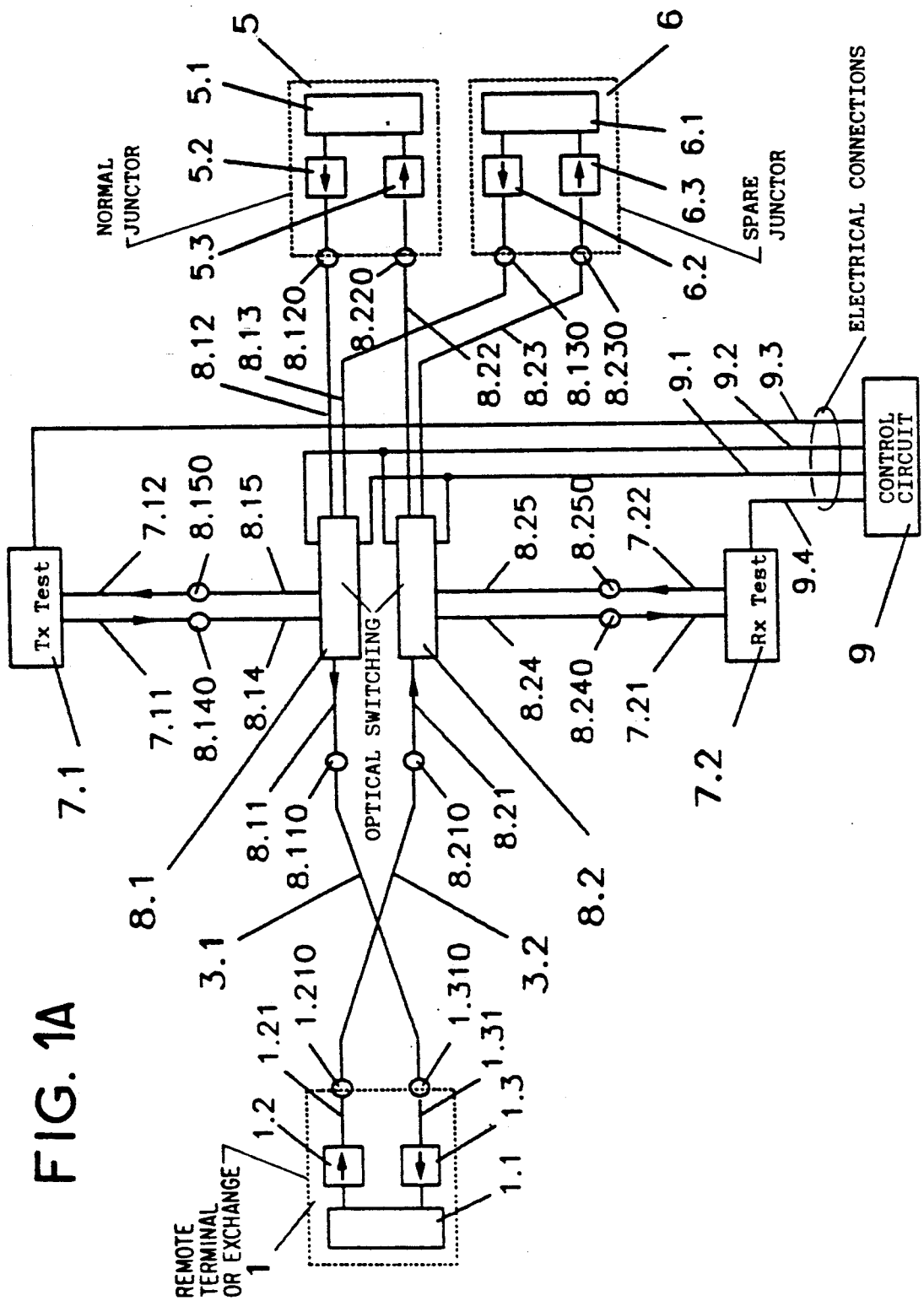
FIG. 1A is an overall block diagram of a system in accordance with the invention for connecting optical distribution and junction lines to an exchange, applicable to the case where each of the optical lines is constituted by two optical fibers.

In FIG. 1A, is a theoretical diagram of a system in accordance with the invention for connecting optical lines to an exchange and it is applicable to the case where each optical line is constituted by two optical fibers each conveying signals relating to one direction of transmission. All items unhelpful in obtaining understanding have been omitted from the figure, and in particular the various components constituting the exchange to which the wideband optical lines are connected and the various items constituting its terminals have all been omitted.

In the figure, 1 is a subscriber terminal located on subscriber premises or a junction junctor at a remote exchange. It comprises a set of electronic circuits 1.1 electrically connected both to an optoelectronic transmitter 1.2 such as a laser diode connected to an intermediate optical fiber 1.21, and to an optoelectronic receiver 1.3 such as a PIN diode connected to an intermediate optical fiber 1.31. The free ends of the intermediate optical fibers 1.21 and 1.31 are connected to respective optical connectors 1.210 and 1.310, and thus to respective optical fibers 3.2 and 3.1 constituting the optical line connecting the exchange to the terminal or to the junction junctor in a remote exchange.

Figure 3:
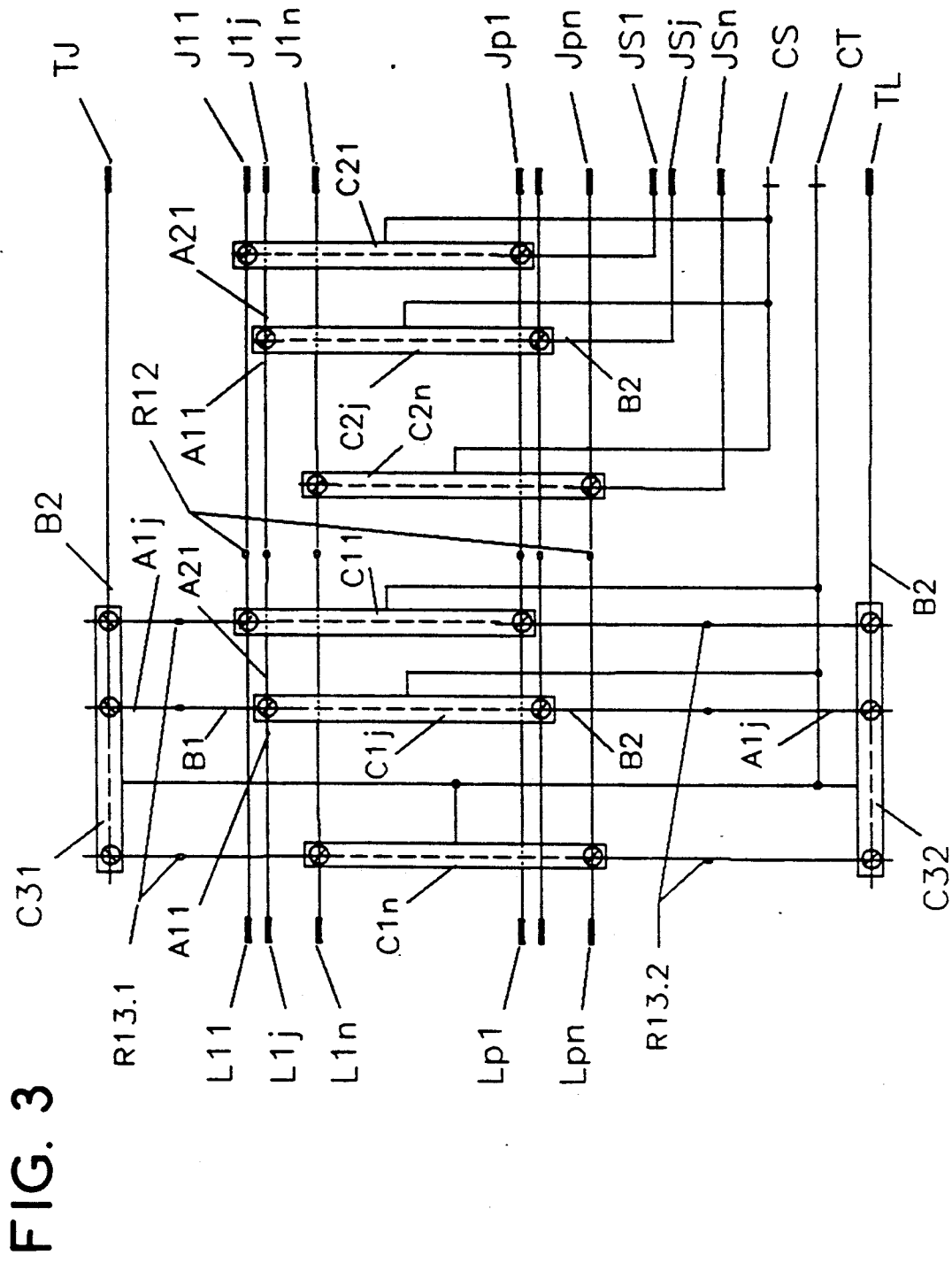
FIG. 3 is a theoretical diagram of a connection module used in the connection system.
Figure 4A:
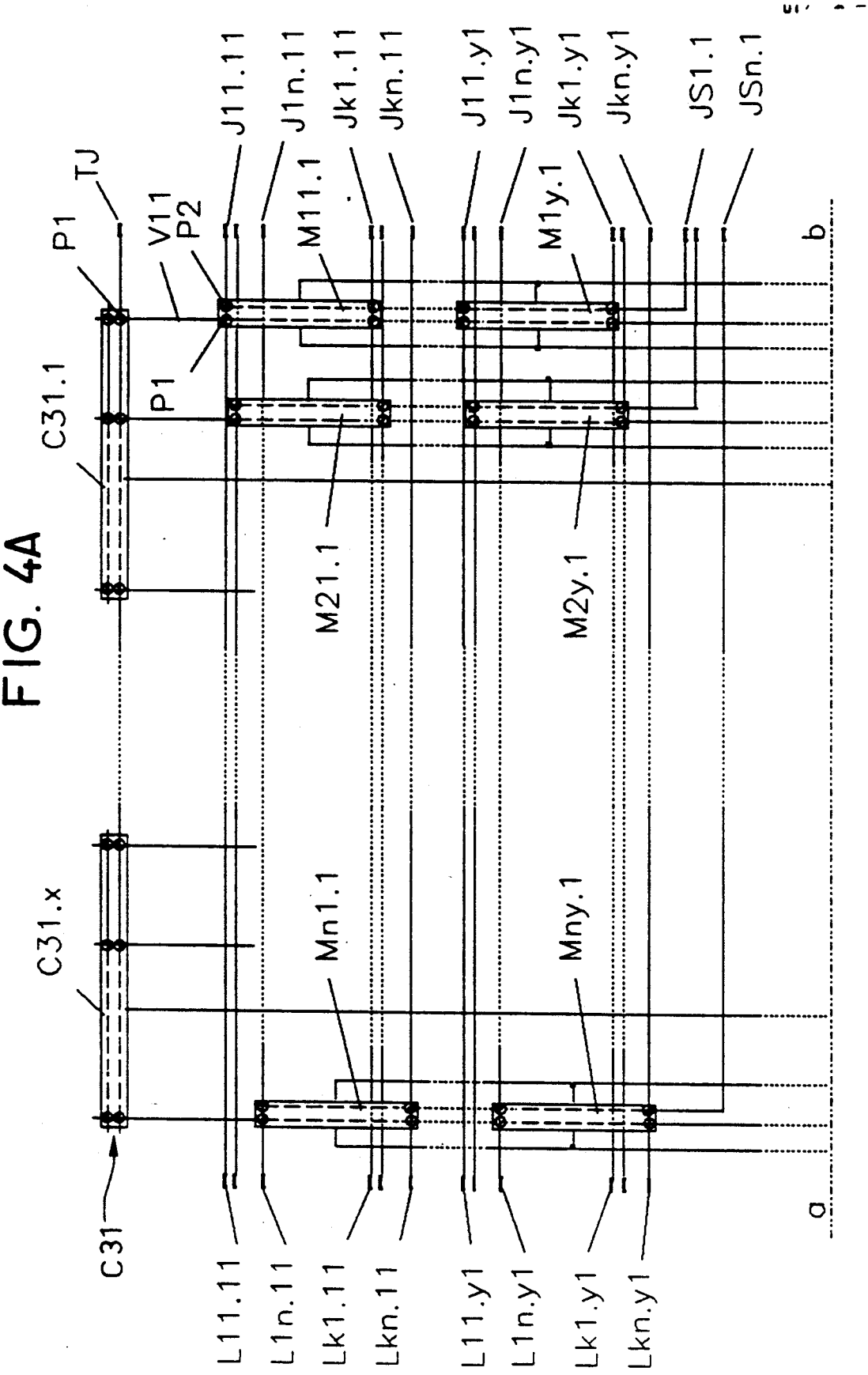
FIGS. 4A and 4B are diagrams showing how a connection module of FIG. 3 is implemented.
Figure 4B:
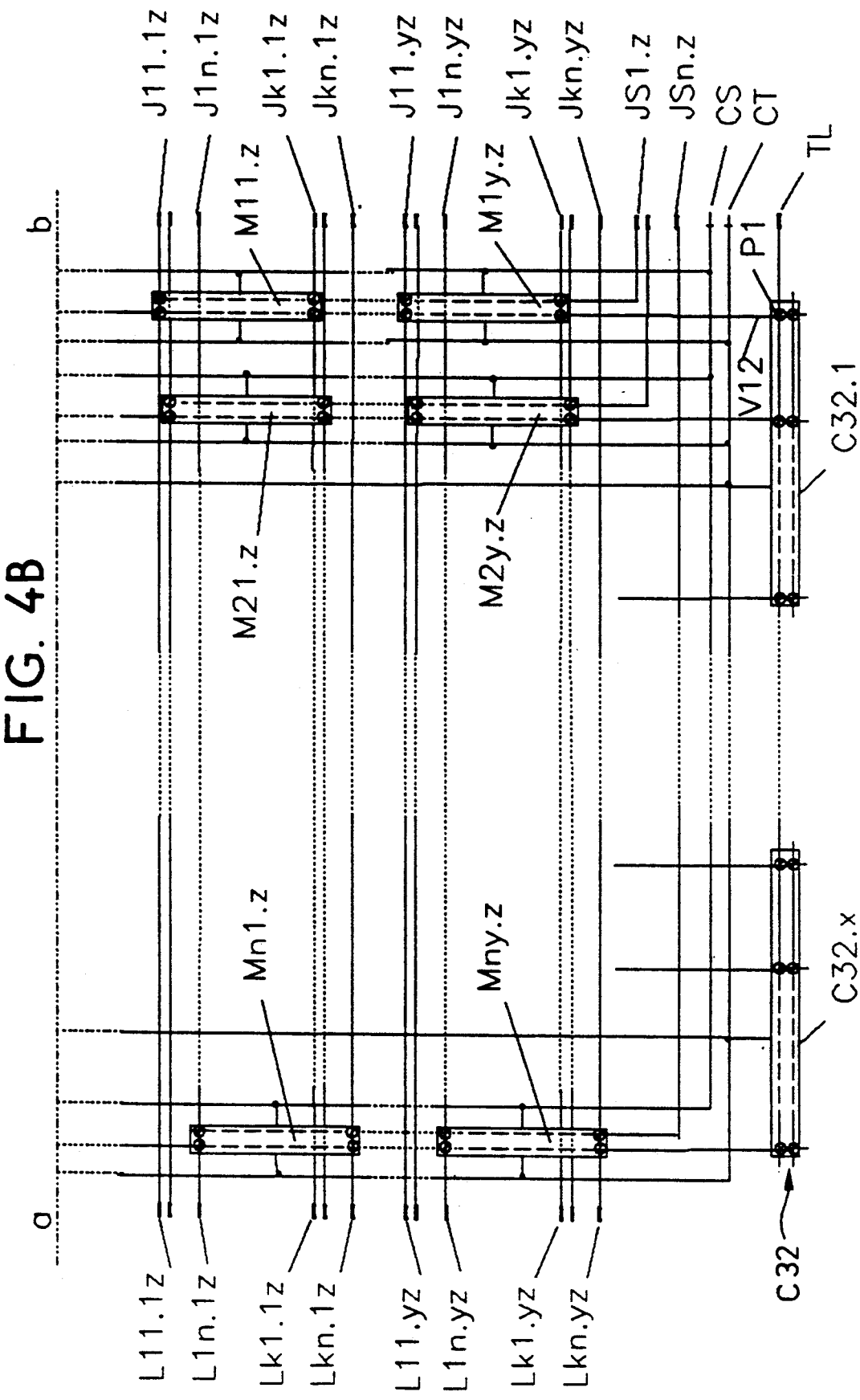
Figure 5:
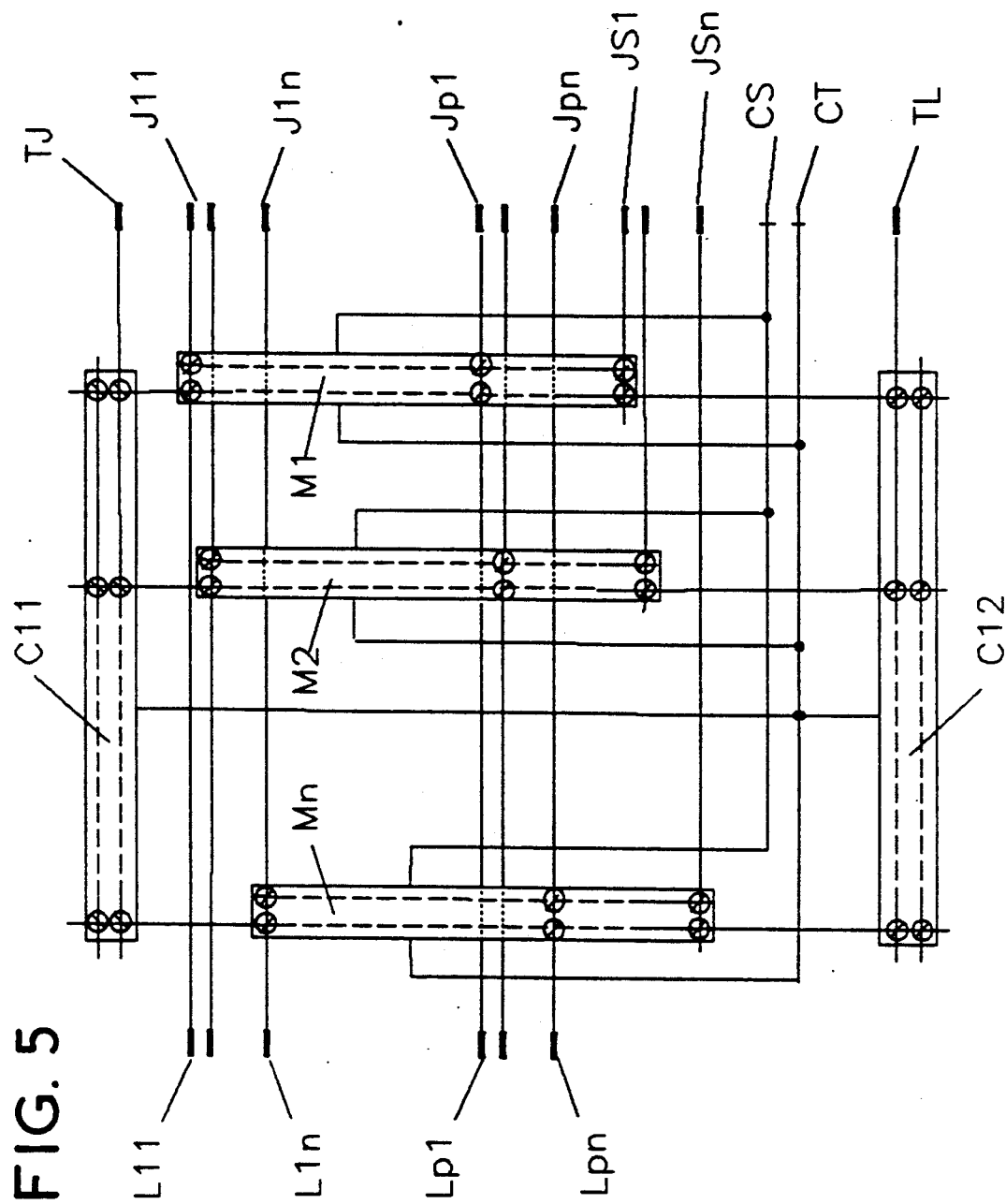
FIG. 5 is another diagram showing how a connection module is implemented.

In the exchange, the fibers 3.1 and 3.2 are respectively connected to optical connectors 8.110 and 8.210 at the ends of two intermediate fibers 8.11 and 8.21 whose other ends are connected to two connection assemblies 8.1 and 8.2 each comprising at least one connection module constituted by optical switches connected as shown in FIG. 3, or in one of FIGS. 4A, 4B, and 5.

The said connection assemblies 8.1 and 8.2 are also connected via respective intermediate fibers 8.12 and 8.22 and their connectors 8.120 and 8.220 to the junctor 5 which is associated in the exchange with the optical line constituted by the fibers 3.1 and 3.2, said intermediate fibers 8.12 and 8.22 being connected respectively to the optoelectronic transmitter 5.2 and the optoelectronic receiver 5.3 of the junctor, and said optoelectronic components being electrically connected to the electronic circuit 5.1 in the junctor for connection to other exchange equipment (not shown).

The said two connection assemblies 8.1 and 8.2 are also connected via optical fibers 8.13 and 8.23 and their optical connectors 8.130 and 8.230 to the optoelectronic transmitter and receiver 6.2 and 6.3 respectively of a spare junctor 6, with said optoelectronic transmitter and receiver being electrically connected to an electronic circuit 6.1 in the junctor for further connection to other exchange equipment (not shown).

Although not shown in the figure, the said two connection assemblies 8.1 and 8.2 are also connected in exactly the same way as described above to a multiplicity of other junction or subscriber connection optical lines and to the junctors which are associated therewith, and also to a multiplicity of spare junctors.

The said connection assembly 8.1 is also connected via two optical fibers 8.14 and 8.15 and their optical connectors 8.140 and 8.150 to optical fibers 7.11 and 7.12 giving access to a transmission test circuit 7.1. Similarly the said connection assembly 8.2 is connected via optical fibers 8.24 and 8.25 and their optical connectors 8.240 and 8.250 to optical fibers 7.2 and 7.22 giving access to a reception test circuit 7.2. The said transmission and reception tests circuits each include line test means and junctor test means controlled by control means (not shown in detail) with said test means having respective optical accesses connected to optical fibers 7.11, 7.21, 7.12, and 7.22.

The said connection assemblies 8.1 and 8.2 are also connected via electrical links 9.1 and 9.2 to a control circuit 9 for controlling the connection system, and the control means of the test circuits 7.1 and 7.2 are likewise respectively connected via electrical links 9.3 and 9.4 to said control circuit 9, which is itself connected to exchange control means (not shown).

The electrical links 9.1 convey switching instructions for the switches that put the optical junctors and lines under test, the electrical links 9.2 convey switching instructions for connecting the optical lines to spare junctors, and electrical links 9.3 and 9.4 convey control instructions and signalling relating to the test circuits.

Two-way transmission between the subscriber terminals or the junctors of junction links, and the associated junctors in the exchange makes use of two separate optical signals, one per transmission direction:

the signal corresponding to transmission from the exchange towards the subscriber is transmitted by the transmitter 5.2 of the exchange junctor, and transits via the intermediate fiber 8.12, the first connection assembly 8.1, the intermediate fiber 8.11, the optical fiber 3.1, and the intermediate fiber 1.31, prior to reaching the optoelectronic receiver 3.1 of the subscriber terminal; and the signal corresponding to transmission from the subscriber towards the exchange is transmitted by the transmitter 1.2 in the subscriber terminal, transiting via intermediate fiber 1.21, optical fiber 3.2, intermediate fiber 8.21, the second connection assembly 8.2, and intermediate fiber 8.22, prior to reaching optoelectronic receiver 5.3 in the junctor.

In a preferred embodiment of the invention, transmission in the exchange-to-subscriber direction uses an optical signal having a wavelength of 1300 nm, in the subscriber-to-exchange direction uses an optical signal having a wavelength of 1550 nm, with the transmitters such as 5.2 and 6.2 and the receivers such as 1.3 being tuned to the first-mentioned wavelength, and with the transmitters such as 1.2 and the receivers such as 5.3 and 6.3 being tuned to the second-mentioned wavelength.

The optoelectronic transmission and reception components in test circuit 7.1 respectively connected to fibers 8.14 and 8.15 are tuned to 1300 nm, and the optoelectronic transmission and reception components of test circuit 7.2 which are respectively connected to fibers 8.24 and 8.25 are tuned to 1550 nm. The connection assemblies 8.1 and 8.2 have the following optical passbands respectively: 1285 nm to 1330 nm, and 1520 nm to 1570 nm.

Figure 1B:
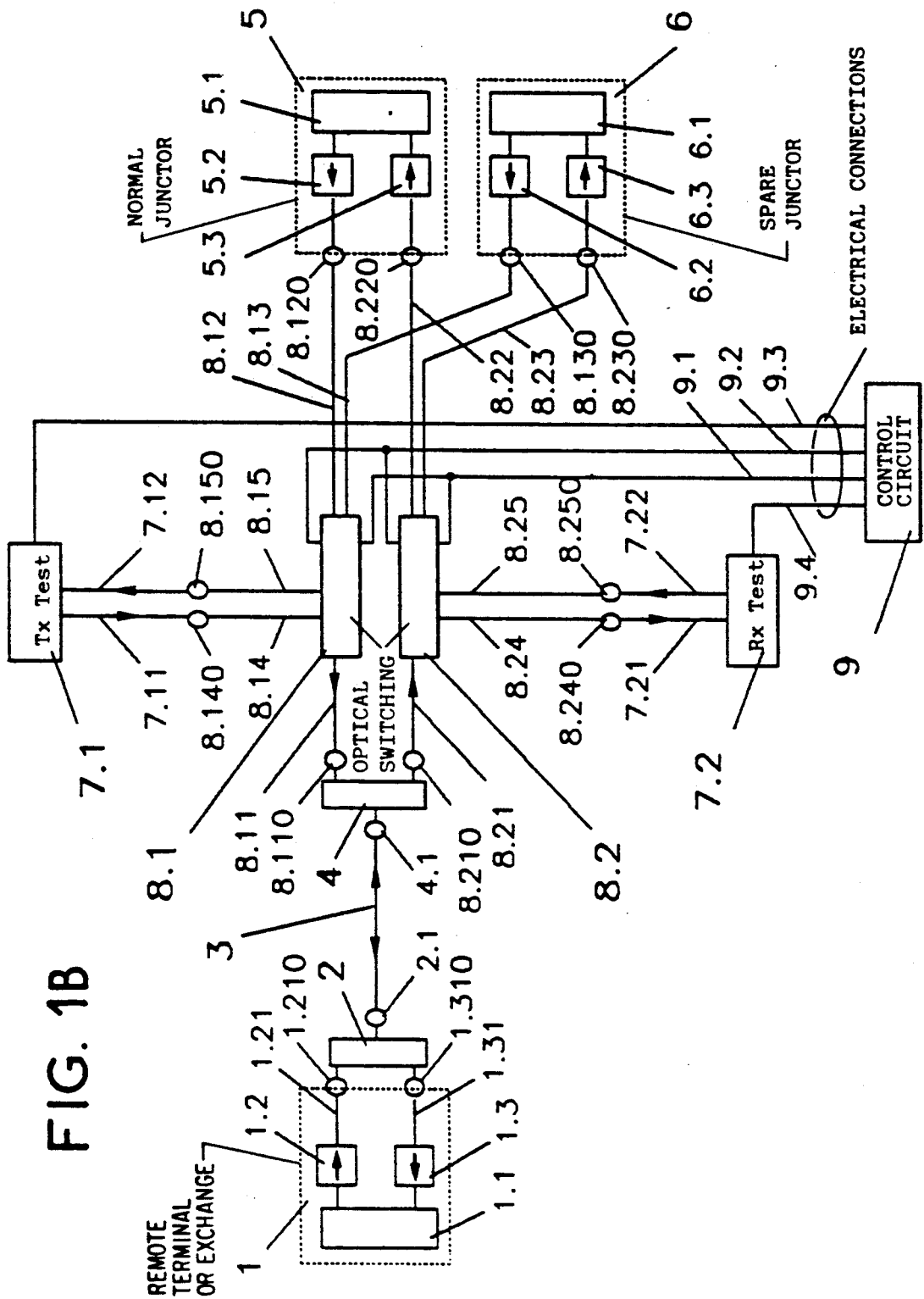
FIG. 1B is an overall block diagram of a system in accordance with the invention for connecting optical distribution and junction lines to an exchange, applicable to the case where each of the optical lines is constituted by a single optical fiber.

FIG. 1B is a theoretical diagram of the exchange connection system when the optical lines are each constituted by respective single optical fibers conveying signals relating to both transmission directions.

The system described is identical to that shown in FIG. 1A except with respect to the line connecting the terminal 1 and the exchange, which in the example shown in FIG. 1B comprises a single optical fiber 3 instead of the two optical fibers 3.1 and 3.2 of FIG. 1A, with said single optical fiber 3 conveying optical signals in both directions, and having each of its ends connected via respective optical connectors 2.1 and 4.1 to respective optical duplexers 2 and 4 for separating the transmission directions at each end of the optical fiber, which duplexers have their other accesses respectively connected to above-described connectors 1.210, 1.310, and 8.110, 8.210.

FIG. 2A shows how an optical switch C used in the connection assembly operates, the switch comprising p connection points Sl, Si, Sp connected in series relative to an optical duct having ends B1 and B2, with each connection point having two other accesses A11-A21, A1i-A2i, A1p-A2p, and being suitable for responding to electrical control signals delivered by control lines CS to establish individual connections either between a first pair of connections A1i-A2i, B1-B2 corresponding to the rest state of the connection point, or else a second pair of connections A1i-B2, B1-A2i, corresponding to the working state of the connection point.

The said switch C may be controlled in two different modes: a first, "single selection" mode which activates a single connection point Si to set up a single pair of connections A1i-B2 and B1-A2in the switch; and a second, "double selection" mode, in which two connection points Si and Sj are activated simultaneously, thereby simultaneously setting up two second connections producing a combination of three optical paths: A1i-A2j; B1-A2i; and A1j-B2.

In a preferred embodiment of the invention, two switches Ca and Cb such as the switch C described above and shown in FIG. 2A are connected together by interconnecting the accesses A2i of the first switch and the accesses A1i of the second switch, thereby constituting an optical matrix OS shown in FIG. 2B, having a first set of p paris of associated optical accesses Ei, Di, a second set of two pairs of optical accesses B11-B21, B12-B22, and two sets of electrical control lines CS1 and CS2 respectively controlling the first and second switches Ca and Cb constituting the matrix.

The optical switch C or optical matrix OS may be made by assemblying known optical connection points such as 2×2 electro-optical couplers of which numerous types are commercially available, or in a preferred embodiment of the connection system, by integrating the optical ducts and the electro-optical couplers constituting the switch or the matrix on a lithium niobate substrate, with the accesses to the ducts being constituted by lead-in optical fibers assembled to the integrated optical waveguides.

FIG. 3 is a theoretical diagram of a connection module constituted by optical switches themselves constituted by switches C of the type described above with reference to FIG. 2A, with the said connection assemblies 8.1 and 8.2 of FIGS. 1A and 1B each comprising at least one connection module.

The optical switches are distributed as a plurality of optical switching assemblies as described below.

A first optical switching assembly is constituted by n optical switches C11, ..., C1n each having its access A1i connected to an optical connector Lij, itself connected to an intermediate line fiber such as the fiber 8.11 or the fiber 8.21 in FIG. 1A, and via its accesses A2i to the accesses A1i of n optical switches C21, ..., C2n of a second optical switch assembly in which each of the accesses A2i is connected to an optical connector Jij, itself connected to a junctor connection intermediate fiber, such as intermediate fibers 8.12 or 8.22 of FIG. 1A.

The n optical switches of the second switch assembly are also each connected via their B2 accesses to an optical connector JSj itself connected to an intermediate spare junctor access fiber, such as intermediate fibers 8.13 or 8.23 of FIG. 1A.

Optical switches C31 and C32 constituting a third optical switch assembly are connected by each of their n accesses A1j to respective B1 accesses and B2 accesses of switches Clj in the first optical switch assembly, and via their B2 accesses to respective optical connectors TJ and TL respectively connectable to the above-described junctor test line and line test line.

The various optical switches constituting the connection module are interconnected by splicing their lead-in fibers, or else by means of optical connectors mounted on their lead-in fibers, with these connections being referenced R12, R13.1, and R13.2 in FIG. 3.

The control lines for the various switches are grouped into two control line groups CT and CS corresponding respectively to controlling test selection and to controlling connections to spare junctor lines.

In FIG. 3, p is the number of connection points in a switch C, and n is the number of switches in the first and second switch assemblies, where n is not greater than p, and the number N1 of optical lines that can be made secure by the connection module is equal to the product (n.p). The number of spare junctors is n.

Each spare junctor is associated with a group of p optical lines.

Since the maximum number of switches that can be equipped in the first and second switch assemblies is equal to p, the maximum number Nm1 of lines that can be made secure by the connection module is equal to $p^2$. The maximum number of spare junctors is equal to p, with each spare junctor being associated with a group of p optical lines.

FIG. 3 is merely a theoretical diagram for simply describing a connection module of the system of the invention.

In a real system, as shown in FIGS. 4A and 4B which are separate halves of the same figure having a join line a-b, use is made of optical matrices OS each comprising two switches Ca and Cb as described with reference to FIG. 2B, and each having k connection points. In FIGS. 4A and 4B, M11.1, ..., Mny.z are optical matrices whose first and second switches Ca and Cb are used respectively for constituting said first and second switch assemblies, and C31.1 to C31.x, C32.1 to C32.x are optical matrices in which only the first switch Ca is used for constituting said third switch assembly, which is constituted by two collections C31 and C32 of optical matrices.

Each of the said first, second, and third switch assemblies is constituted by interconnecting a plurality of optical matrices in series, x matrices for each of the collections C31 and C32 of the third switch assembly, and (y.z) matrices for each of the not more than n=(x.k) collections constituting said first and second switch assemblies.

For the said first and third switch assemblies, access B12 of the matrix of rank 4 in one collection is connected to access B11 of the matrix of rank r+1, with accesses B11 of the first matrix and B12 of the last matrix of the collection in said first switch assembly being respectively connected to access A1i (access Ei of the matrices) of corresponding rank in the collections C31 and C32, with accesses Ei and Di of each of the matrices forming said first and second switch assemblies being respectively connected to an optical connector L and an optical connector J, and the respective B12 accesses of the last matrices in the collections C31 and C32 of said third switch assembly being respectively connected to optical connectors TJ and TL as described above.

For the said second switch assembly, there are z elementary collections each containing y matrices in each of which the access B22 of the optical matrix of rank r is connected to the access B21 of the optical matrix of rank r+1, with the access B22 of the last optical matrix in each elementary collection being connected to an above-described optical connector JS.

The number z of elementary collections is such that the product (n.z) is not less than the number s of spare junctors required for providing line security, with the number s being determined as a function of the desired quality of service, of the reliability of the equipment, and of the acceptable frequency of maintenance operations.

The maximum number Nm2 of lines capable of being made secure by the connection module is $Nm2=(n.y.z.k)=(x.y.z.k^2)$ and the maximum number of spare junctors capable of being connected is $s=(n.z)=(x.k.z)$, with each of the spare junctors being associated with a group of (y.k) optical lines.

This arrangement thus makes dimensioning the securization system very flexible.

It also makes it possible to optimize the loss caused by the connection points inserted in the optical paths of the spare and test lines by reducing the number of inserted connection points: for example, the maximum number of connection points inserted on an optical test path in the system is equal to $k.(x+(y.z))$, whereas it would be equal to $(x.y.z.k^2)$ if the system used only one access selector to the test device connected to all of the lines.

The control lines for the various switches are grouped into two groups of control lines CT and CS corresponding respectively to controlling test selections and to controlling spare junctor line connections, with the two groups being respectively connected to electrical control lines 9.1 and 9.2 of FIG. 1A and 1B.

FIG. 5 is a theoretical diagram of a connection module constituted by a different arrangement of switches based on the same components.

All the structural details concerning the said first and third switch assemblies are the same as those described above. The only structural arrangements to be changed relate to connecting the spare junctors to the said second switch assembly: instead of being connected to the B22 accesses of the last matrices in each of the z elementary collections constituting the said second switch assemblies, the spare junctors are connected to the last accesses Dp (FIG. 2B) of the same last matrices via optical connectors JS.

This arrangement makes it possible to use, as spare junctors, either the last junctor of each of the groups of junctors constituting an assembly of a multiplicity of groups of junctors, or else the junctors of the last group in said assembly of a multiplicity of groups of junctors, with each of the junctors used as spare junctors not being associated, in this case, with a particular optical line.

Returning to the notation defined above for FIGS. 4A and 4B, the number N3 of optical lines for which security can be provided by the connection module is equal to $(x.y.z.(k-1).k)$, and the maximum number of spare junctors that can be connected is $s=(x.k.z)$, with each of the spare junctors being associated with a group of $y.(k-1)$ optical lines.

The connection of a spare junctor to a line requiring it takes place via double selection in the corresponding switch in the second assembly, as described above.

Figure 7:
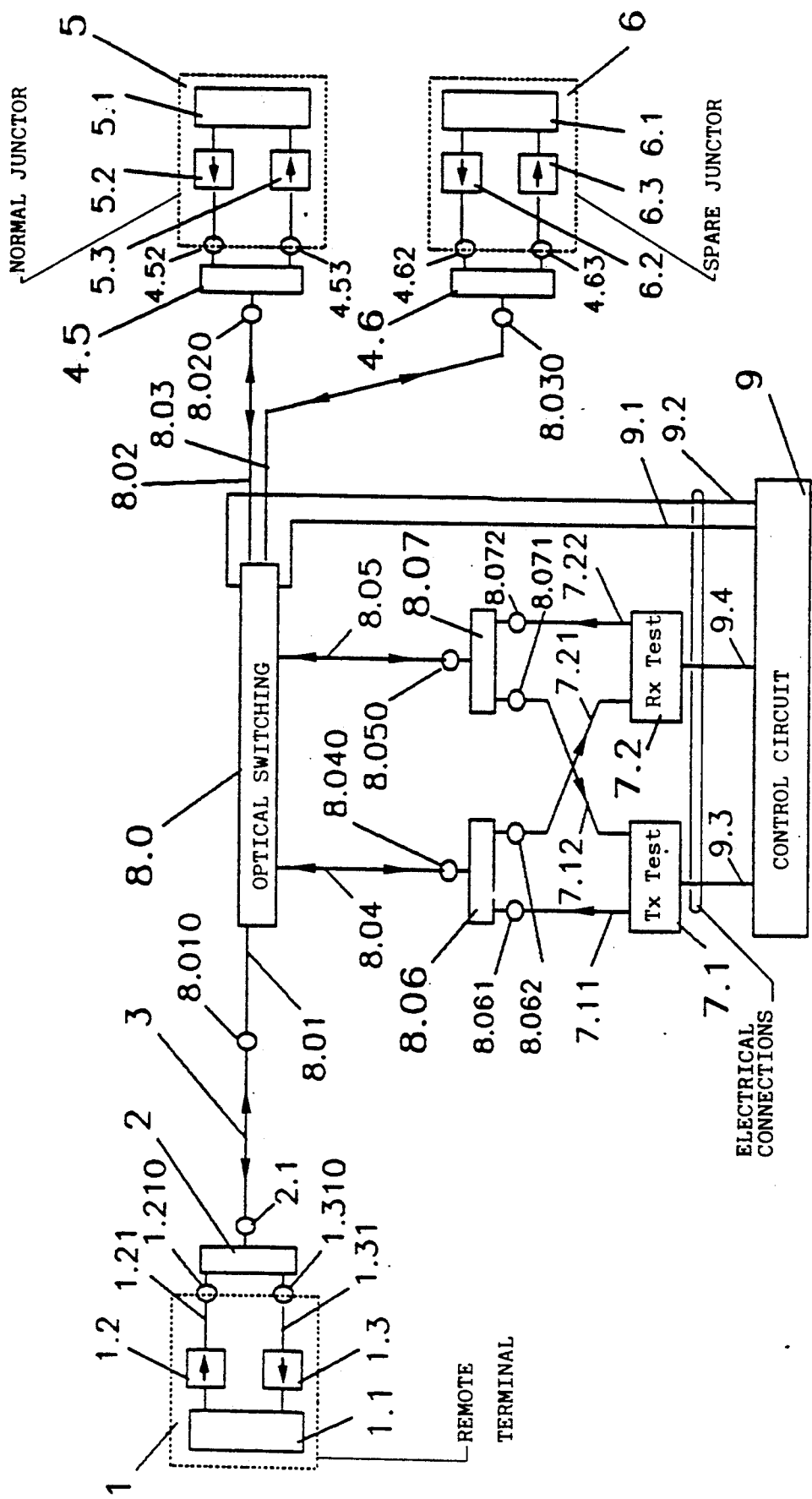
FIG. 7 is a theoretical diagram of a variant of the switching system including a single connection assembly using very wide passband optical switches.

In the most frequent applications of the invention, the connection assemblies 8.1 and 8.2 of FIGS. 1A and 1B, and 8.0 of FIG. 7 are each constituted by a single connection module connected to connectors TJ and TL which are directly connected to test circuit access fibers.

Figure 6:
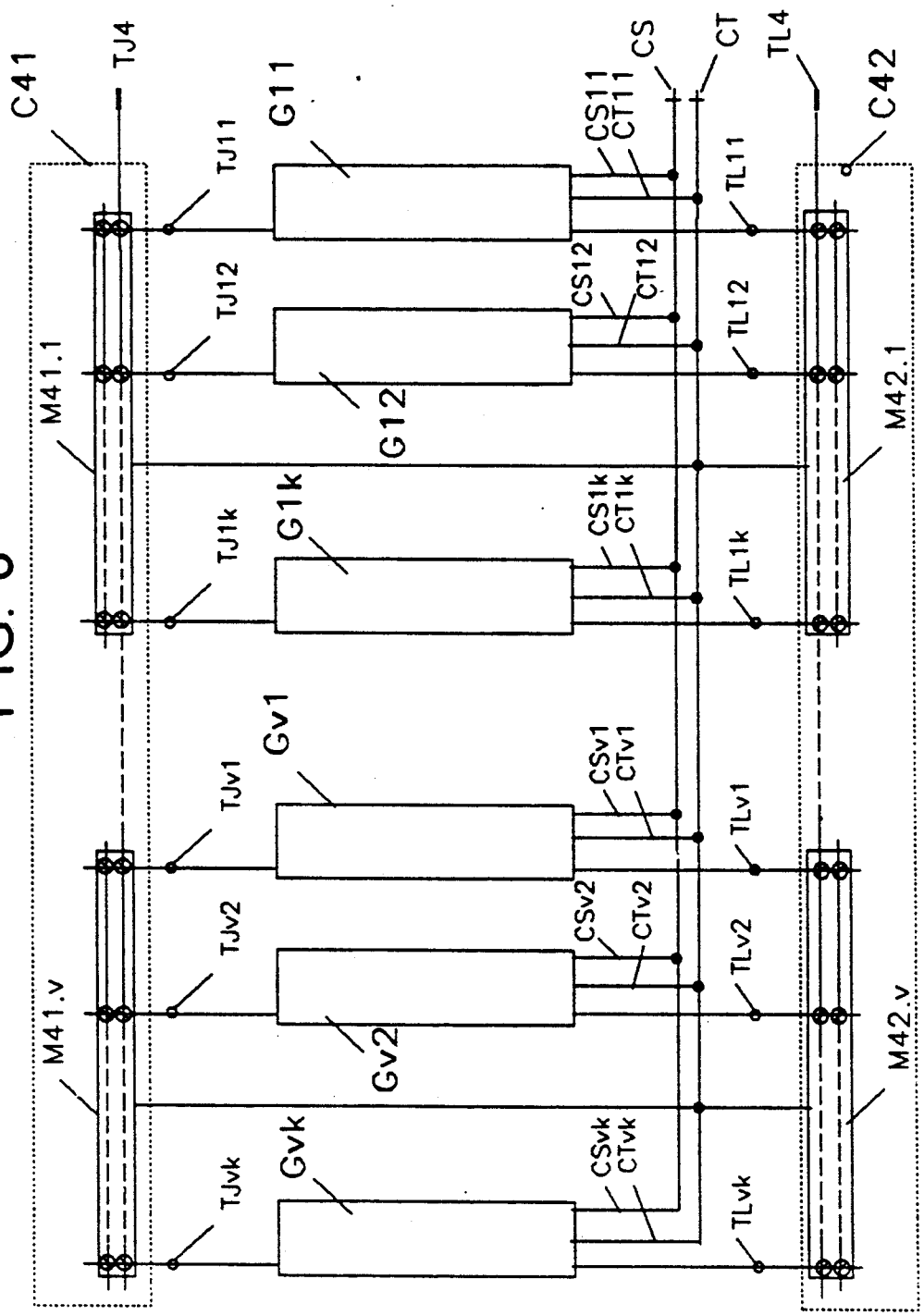
FIG. 6 is a theoretical diagram showing how a large capacity connection assembly including a plurality of connection modules, is implemented, said assembly being suitable for use in a connection system having a very large number of lines.

FIG. 6 is a theoretical diagram of a large capacity connection assembly capable of connecting a very large number of lines.

A plurality of connection modules (G11, ..., Gvk), such as those described in FIGS. 3, 4A, 4B, or 5, have their accesses TJ and TL (TJ11, ..., TJvk and TL11, ..., TLvk) connected to a fourth optical switch assembly constituted by two collections C41 and C42 of v optical matrices M41.1, ..., M41.V and M42.1, ..., M42.v each, said collections being similar to the collections C31, C32 constituting the third switch assembly of FIGS. 4A and 4B.

Each of the accesses TJ is connected to an access Ei of one of the matrices M41.1 to M41.v constituting the first collection C41 of the fourth optical switch assembly.

Each of the accesses TL is connected to an access Ei of one of the matrices M42.1 to M42.v constituting the second collection C42 of the fourth optical switch assembly.

The collections C41 and C42 are respectively connected from accesses B12 of optical matrices M41.1 and M42.1 to test line access connectors TJ4 and TL4.

The control lines of the various switches are grouped together in bundles CS and CT connected to the control circuit as described above.

If v is the number of optical matrices constituting a fourth switch assembly, then the maximum number of lines that can be made secure by the system is either:

$Nm4 = (x.y.z.v.k.k^2)$ when the connection modules are of the type shown in FIGS. 4A and 4B, with the maximum number of spare junctors that can be connected then being:

$sm4 = (x.k^2.z.v)$, with each of the spare junctors being associated with a group of $(y.k)$ optical lines, or $Nm5 = (x.y.z.v.(k-1).k^2)$, when the connection modules of the type as shown in FIG. 5, with the maximum number of spare junctors that can then be connected being:

$sm5 = (x.k^2.z.v)$, with each of the spare junctors being associated with a group of $y.(k-1)$ optical lines.

FIG. 7 shows a different arrangement of the system of the invention making use of wide passband optical switches (bandwidth extending, for example, from 1285 nm to 1570 nm), and suitable for transmitting optical signals relating to both transmission directions on the optical lines and useable for making connections to optical lines each constituted by a single optical fiber.

The single fibers 3 constituting the lines are connected at their exchange ends via connectors 8.010 and intermediate fibers 8.01 to a single connection assembly 8.0 including at least one connection module organized as described above with reference to FIGS. 3, 4A, 4B, 5, or 6, which connection assembly is also connected via intermediate fibers 8.02 and optical duplexers 4.5 to junctors 5 associated with the optical lines 3, via optical fibers 8.03 and optical duplexers 4.6 to spare junctors 6, via a fiber 8.04 and a duplexer 8.06 whose other accesses are connected respectively to fibers 7.11 and 7.21, and via a fiber 8.05 to a duplexer 8.07 whose other accesses are respectively connected to the fibers 7.12 and 7.22. The fibers 7.11 and 7.12 give access to the above-described transmission test circuit 7.1, and the fibers 7.21 and 7.22 give access to the above-described reception test circuit 7.2.

The invention will be better understood from the following description given by way of example of the operation of the system shown in FIG. 1A in which each of the connection assemblies 8.1 and 8.2 is assumed to comprise a single connection module of the type illustrated in FIGS. 4A and 4B.

Under routine conditions, proper operation of each of the optical links is tested cylically during a period of low traffic (as determined by the exchange control members), under supervision of the exchange's general supervisory and maintenance means, which means may be situated in the exchange itself or centralized at a maintenance center separate from the exchange. Testing comprises the following operations:

verifying that the optical line to be tested is inactive by interrogating the control members of the exchange;

sending line test instructions including the address of said line from the general exchange supervisory and maintenance means to the control circuit 9 (FIG. 1A);

calculating the addresses of the switching points concerned in the connection assemblies 8.1 and 8.2 (by means of the control circuit 9);

transmitting said switching point addresses from the control circuit 9 over electrical links 9.1;

in each of the two connection assemblies 8.1 and 8.2, disposing the connection points concerned in the first and third switch assemblies using the following process: it is assumed that the optical link to be tested is connected as described above to link L11.11 of FIGS. 4A and 4B, and two addresses are presented simultaneously in the form of electrical signals on link CT connected to link 9.1; the first address simultaneously causes connection points P1 in optical matrices C31.1 and C32.1 of the third switch assembly to operate, thereby respectively establishing optical continuity between TJ and V11, and between TL and V12; the second address controls connection point P1 in optical matrix M11.1 which interrupts optical continuity between L11.11 and J11.11 and sets up two new optical continuities between L11.11 and V12, and between J11.11 and V11; thus, L11.11 is optically connected to TL and J11.11 is optically connected to TJ via the newly set up optical paths;

testing: once the above process has been performed in both of the connection assemblies 8.1 and 8.2 (FIG. 1A), the optical line on a test and the associated junctor are optically connected to the transmission and reception test circuits 7.1 and 7.2 and the control circuit 9 sends them test activation instructions over links 9.3 and 9.4 respectively, and it receives result signals therefrom;

the circuit 7.1 independently monitors both reception from the transmission device 5.2 of the junctor 5 on test and independently by transmission via optical line 3 and the reception devices 1.3 in the subscriber terminal 1;

the circuit 7.2 independently monitors both transmission to the receptor device 5.3 in the junctor 5 on test, and reception via optical line 3 and the transmission devices 1.2 of subscriber terminal 1;

disconnecting the line under test: once the test sequences are over, the control circuit 9 simultaneously applies new address signals to the two connection assemblies 8.1 and 8.2 relating to the previously-activated connection points so that said points are returned to their initial states, thereby breaking optical continuity between L11.11 and TL and between J11.11 and TJ, while simultaneously re-establishing optical continuity between L11.11 and J11.11, thus, after being tested, the optical line is reconnected to its own junctor and becomes available for activity; and signalling: an end-of-line-test message is then sent by the control circuit 9 to the general supervisory and maintenance means of the exchange which can then start testing another line by repeating the above-described process.

If a fault is observed on a link by other devices supervise the lines while they are active, then the general supervisory and maintenance means of the exchange puts the line in question under test in the same manner as described above in order to attempt to locate the fault.

If a line junctor is found to be faulty, either during routine testing or else during the procedure for locating faults, then the optical line concerned is switched over to a spare junctor insofar as a spare junctor is available for the group of links to which the faulty junctor belongs.

The switchover takes place using the following procedure: assume that the junctor connected to J11.11 of FIG. 4 is detected as being faulty, and the control circuit 9 (FIG. 1A) has received a switchover instruction from the general supervisory and maintenance means of the exchange, the control circuit 9 uses electrical links 9.2 to send the address of the connection point concerned in each of the connection assemblies 8.1 and 8.2, i.e. in the present example the address of connection point P2 in optical matrix M11.1 of the connection module in each of the connection assemblies. This address received over link CS of each connection module of FIGS. 4A and 4B causes the connection point P2 of M11.1 to operate in such a manner as to break optical continuity between L11.11 and J11.11 and to establish optical continuity between L11.11 and JS1.1, i.e. between the optical line in question and the spare junctor for the group to which the line belongs.

Once the nominal junctor for the optical line connected to J11.11 has been repaired, then the nominal connection is re-established by sending an instruction over the above-described paths to connection point P2, instructing it to break optical path L11.11 to JZ1.1 and re-establish the optical path from L11.11 to J11.11.

It should be observed that the optical link including the line and the spare junctor may be tested using the above-described normal procedure, by switching the connection points P1 in optical matrices C31.1, C32.1, and M11.1, so that the optical line is then connected to TL and the spare junctor is connected to TJ.

It should also be observed that when the test circuits 7.1 and 7.2 are not connected to any line or junctor via the first optical switch assembly, they may themselves be tested by connecting their transmission circuits to their reception circuits via the first and third (and fourth if present) optical switch assemblies, thereby also testing said switches.

By virtue of the high degree of modularity in the collections of switches it uses and by virtue of the configuration facilities flowing therefrom, the system of the invention makes it possible to optimize:

the number of test means required;
the number of spare junctors that need to be fitted; and
the number of connection points and connection splices inserted in the test optical paths and the security optical paths, and consequently the loss on said paths, thereby avoiding the need to provide the test equipment and the spare junctors with optical transmission and reception means different in kind from those provided for the line junctors.

The invention also makes it possible to test optical links connected to spare junctors without requiring the nominal test procedures to be modified.

The invention enables the test devices to test themselves by connecting the transmission circuits to the reception circuits of each test circuit.

The invention thus constitutes a clear improvement over the prior art with respect to equipment for wideband communication systems, both because of its modular characteristics which make it possible to provide security for a wide range of sizes of optical line connection system, and by the possibility provided for monitoring lines connected to spare junctors, thereby improving the service offered and facilitating maintenance management.

Naturally, the invention is not limited in any way to the embodiments described and shown which have been given merely by way of example. In particular, without going beyond the scope of the invention, it will be possible to modify various arrangements or replace various means by equivalent means.

I claim:

1. A system for connecting a local exchange to optical subscriber lines and to optical junction lines in a wideband multiservice telecommunications network, each of said optical subscriber lines being connected firstly to a transmission circuit and a reception circuit in a subscriber terminal located on subscriber premises and secondly to a transmission circuit and a reception circuit in a junctor of said local exchange, each optical junction line being connected to a transmission circuit and a reception circuit in a junctor of a distant exchange and to a transmission circuit and a reception circuit of a junctor in the local exchange, said local exchange also including spare junctors, wherein:

the optical subscriber and optical junction lines are connected to the junctors of the local exchange and to its spare junctors via at least one connection assembly including at least one connection module having a connection capacity of N optical lines;

a connection module comprises first, second, and third optical switch assemblies; and in the connection module, the first optical switch assembly is connected to the optical subscriber and optical junction lines, the second optical switch assembly is connected both to the first optical switch assembly and to the junctors in said local exchange and to the spare junctors associated with the N optical lines, and the third optical switch assembly is connected both to the first optical switch assembly and to at least one test circuit via a test line optical fiber and via a junctor test optical fiber.

2. A connection system according to claim 1, wherein:

the optical subscriber and optical junction lines are connected to the junctors of the local exchange and to the spare junctors via a single connection assembly conveying optical signals in both call directions;

each optical subscriber line and optical junction line is constituted by a single optical fiber conveying optical signals in both call directions;

each junctor and each spare junctor is connected to the second optical switch assembly via a respective duplexer and a respective single optical fiber; and the connection assembly is connected via a line test optical fiber and a duplexer to a transmission test circuit and a reception test circuit, and via a junctor test optical fiber and another duplexer to said transmission test circuit and to said reception test circuit.

3. A connection system according to claim 1, including first and second connection assemblies each specific to one call direction, wherein:

each transmission circuit of the junctors and of the spare junctors is connected via a transmission fiber to the first connection assembly;

each reception circuit of the junctors and of the spare junctors is connected via a reception fiber to the second connection assembly;

each optical subscriber line and optical junction line is constituted by a single optical fiber connected to both connection assemblies by means of a duplexer;

each connection assembly is connected via an optical fiber to said duplexer; and the first connection assembly is connected to a transmission test circuit, with the second connection assembly being connected to a reception test circuit.

4. A connection system according to claim 1, including first and second connection assemblies each specific to one call direction, wherein:
   each transmission circuit of the junctors and of the spare junctors is connected via a transmission optical fiber to the first connection assembly;
   each reception circuit of the junctors and of the spare junctors is connected via a reception optical fiber to the second connection assembly;
   each optical subscriber line and optical junction line is constituted by first and second optical fibers;
   each reception circuit of the subscriber terminals and of the remote junctors is connected via the first optical fiber of an optical line to the first connection assembly;
   each transmission circuit of the subscriber terminals and of the remote junctors is connected via the second optical fiber of an optical line to the second connection assembly; and
   the first connection assembly is connected to a transmission test circuit, while the second connection assembly is connected to a reception test circuit.

5. A connection system according to claim 1, wherein a connection assembly comprises a plurality of connection modules and a fourth optical switch assembly, the third optical switch assembly of each of the connection modules is connected to the fourth optical switch assembly, and the said fourth optical switch assembly is connected to at least one test circuit via said line test optical fiber and via said junctor test optical fiber.

6. A connection system according to claim 1, wherein each optical switch assembly is constituted by optical switches each having two groups of accesses the first group of accesses comprising p pairs of accesses each comprising a first access and a second access which are normally connected to each other via means internal to the optical switch, and the second group of accesses comprising a first access and a second access which are respectively connected to the first access and the second access of any one of the p pairs of accesses in the first group by means internal to the optical switch after breaking the internal connection between the access in the pair.

7. A connection system according to claim 6, wherein the optical switches of the connection assemblies are connected via control lines to a control circuit which is itself connected to the control means of the exchange, with the transmission test circuits and the reception test circuits being connected to said control circuit via respective links.

8. A connection system according to claim 1, wherein optical switches of the first and second optical switch assemblies which are interconnected to each other are associated to form an optical matrix.

9. A connection system according to claim 1, wherein the second optical switch assembly is constituted by optical switches each having two groups of p accesses such that the accesses of the same rank in each of the two groups are associated and connected to each other via means internal to the optical switches, and at least one internal connection via which any one of the accesses of the first group may be connected to any one of the accesses of the second group after breaking the respective internal connections between each of said accesses and the accesses associated therewith.

10. A connection system according to claim 7, wherein the optical switches of the connection assemblies are connected via control lines to a control circuit which is itself connected to the control means of the exchange, with the transmission test circuits and the reception test circuits being connected to said control circuit via respective links.

* * * * *